(12) United States Patent
Lekovic et al.

(10) Patent No.: US 6,803,390 B2
(45) Date of Patent: Oct. 12, 2004

(54) RIGID POLYURETHANE FOAMS

(75) Inventors: Huzeir Lekovic, Troy, MI (US); Ali J. El-Khatib, Dearborn, MI (US); Frank V. Billotto, Rochester, MI (US)

(73) Assignee: Dow Global Technologies Inc., Midland, MI (US)

( * ) Notice: Subject to any disclaimer, the term of this patent is extended or adjusted under 35 U.S.C. 154(b) by 37 days.

(21) Appl. No.: 10/109,959

(22) Filed: Mar. 29, 2002

(65) Prior Publication Data

US 2003/0018096 A1 Jan. 23, 2003

Related U.S. Application Data

(60) Provisional application No. 60/280,728, filed on Apr. 2, 2001.

(51) Int. Cl.[7] ............................................. C08G 18/28
(52) U.S. Cl. .................... 521/159; 521/137; 521/170; 428/308.9; 428/319.3; 428/423.1
(58) Field of Search ................................ 521/137, 159, 521/170; 428/308.9, 319.3, 423.1

(56) References Cited

U.S. PATENT DOCUMENTS

| 5,091,436 | A | * | 2/1992 | Frisch et al. | 521/137 |
|---|---|---|---|---|---|
| 5,271,612 | A | | 12/1993 | Yada et al. | 267/158 |
| 5,274,006 | A | | 12/1993 | Kagoshima et al. | 521/85 |
| 5,344,856 | A | | 9/1994 | Klein | 523/403 |
| 5,817,860 | A | | 10/1998 | Rizk et al. | 560/25 |
| 6,040,350 | A | | 3/2000 | Fukui | 521/135 |

* cited by examiner

Primary Examiner—John M. Cooney, Jr.

(57) ABSTRACT

Polyurethane foams are made using a prepolymer that is the reaction product of an organic polyisocyanate, a hydroxy-functional acrylate or methacrylate, and a polyol. This prepolymer is reacted at specified volume ratios and isocyanate indices with a polyol component that includes at least one polyol. The foam is made in the presence of a blowing agent and catalyst. Preferred blowing agents are water and chemical blowing agents that generate carbon dioxide in the reaction. Preferred catalysts have primary or secondary amine groups that allow them to react into the resulting polymer structure, thus decreasing the level of volatile components.

22 Claims, No Drawings

RIGID POLYURETHANE FOAMS

This application claims benefit of 60/280,728 filed Apr. 2, 2001.

BACKGROUND OF THE INVENTION

The present invention relates to rigid polyurethane foams, particularly rigid polyurethane foams that are useful as reinforcement materials, such as in the auto industry.

Rigid foams have been used in the auto and other industries for a number of purposes. For example, rigid foams have been used for structural reinforcement, preventing corrosion and damping sound and vibration. These foams are typically formed by applying a reactive foam formulation to a part and allowing the formulation to foam in place. The part is often already assembled onto a vehicle when the foam is applied. This means that the foam formulation must be easy to mix and dispense, must cure rapidly before it runs off the part, and preferably initiates curing at moderate temperatures. To minimize worker chemical exposure, the formulation is preferably is low in volatile organic compounds, especially volatile isocyanates and amines. The individual components are preferably storage-stable at room temperature for an extended period.

One foaming system for these applications is based on the prepolymer described by Rizak et al. in U.S. Pat. No. 5,817,860. The prepolymer described in that patent is made by reacting an isocyanate with a monofunctional alcohol and a polyol. Foams are made from this prepolymer by reacting it with water. While good quality foam can be made using this approach, it has several drawbacks. First, because the prepolymer is cured with a water stream, the volume ratio of the reactants (prepolymer and water) is often quite high, such as 15:1 or more. Much of the commercially available dispensing equipment cannot handle such high component ratios. Second, in order to get a sufficiently fast reaction with this system, it is often necessary to preheat the components to temperatures of 80° C. or more. This increases energy costs, exposes workers to high temperature reactants and reduces the viscosity of the system, thereby promoting run-off.

It would therefore be desirable to provide a rigid polyurethane system that can be applied at lower volume ratios and can be applied at lower operating temperatures.

SUMMARY OF THE INVENTION

In one aspect, this invention is a method of making a rigid polyurethane foam, comprising mixing a polyisocyanate component with a polyol component in the presence of at least one catalyst for the reaction of a polyol or water with a polyisocyanate and subjecting the mixture to conditions sufficient to cause it to cure to form a polyurethane foam having a bulk density of 45 pounds per cubic foot (720 kg/m$^3$) or less, wherein (a) the polyisocyanate component contains an isocyanate-terminated prepolymer made by reacting an excess of an organic polyisocyanate with (i) at least one polyol and (ii) at least one hydroxy-functional acrylate or methacrylate,
(b) the polyol component containing an effective amount of a blowing agent and isocyanate-reactive materials that have an average functionality of at least about 2.3 and include at least one polyol and,
(c) the volume ratio of the polyisocyanate component to the polyol component is no greater than 10:1, and
(d) the ratio of isocyanate groups in the polyisocyanate component to the number of isocyanate-reactive groups in the polyol component is from about 0.8:1 to about 1.5:1.

In a second aspect, this invention is an isocyanate-terminated prepolymer which is the reaction product of an excess of an organic polyisocyanate with (i) at least one polyol and (ii) at least one hydroxy-functional acrylate or methacrylate.

In a third aspect, this invention is a reactive system comprising (a) a polyisocyanate component that contains an isocyanate-terminated prepolymer made by reacting an excess of an organic polyisocyanate with (i) at least one polyol and (ii) at least one hydroxy-functional acrylate or methacrylate,
(b) a polyol component containing an effective amount of a blowing agent and isocyanate-reactive materials that have an average functionality of at least about 2.3 and include at least one polyol,
wherein the system is further characterized by
(c) a volume ratio of polyisocyanate component to polyol component of no greater than 10:1,
(d) a ratio of isocyanate groups in the polyisocyanate component to isocyanate-reactive groups in the polyol component from about 0.8:1 to about 1.5:1 and
(e) at least one of the polyisocyanate component or the polyol component containing a catalyst for the reaction of an isocyanate with a polyol or water.

The process of this invention provides a method by which rigid polyurethane foam can be prepared at convenient mix ratios and at moderate operating temperatures while still allowing the formulation to cure quickly into good quality foam. The method and resulting foam is especially suitable for making foamed-in-place reinforcing and sound- or vibration-dampening foam, especially for automotive applications, as it is easily foamed in place where reinforcement is needed.

DETAILED DESCRIPTION OF THE INVENTION

The polyisocyanate component comprises an isocyanate-terminated prepolymer that is made from an excess of an organic polyisocyanate, a hydroxy-functional acrylate or methacrylate, and a polyol. The equivalent ratio of the hydroxy-functional acrylate or methacrylate to polyol is advantageously from about 0.5:1, preferably from about 0.75:1 and more preferably from about 1.25:1 to about 4:1, preferably to about 3:1, even more preferably to about 2:1. The total number of equivalents of hydroxy-functional acrylate or methacrylate plus polyol(s) to the equivalents of starting organic polyisocyanate is advantageously such that the prepolymer has an isocyanate equivalent weight of from about 150, preferably from about 175, to about 500, preferably to about 350, more preferably to about 250. These isocyanate equivalent weights correspond to NCO contents of from about 28–8.4%, preferably from 24–12%, more preferably from about 24–16.8%.

Suitable polyisocyanates that can be used in preparing the prepolymer include aromatic, aliphatic and cycloaliphatic polyisocyanates. Aromatic polyisocyanates are generally preferred based on cost, availability and properties, although aliphatic polyisocyanates are preferred in instances where stability to light is important. Exemplary polyisocyanates include, for example, m-phenylene diisocyanate, 2,4- and/or 2,6-toluene diisocyanate (TDI), the various isomers of diphenylmethanediisocyanate (MDI), hexamethylene-1,6-diisocyanate, tetra methylene-1,4-diisocyanate, cyclohexane-1,4-diisocyanate, hexahydrotoluene diisocyanate, hydrogenated MDI (H$_{12}$ MDI), naphthylene- 1,5-diisocyanate, methoxyphenyl-2,4-diisocyanate, 4,4'-biphenylene diisocyanate, 3,3'-dimethyoxy-4,4'-biphenyl diisocyanate, 3,3'-dimethyldiphenylmethane-4,4'-diisocyanate, 4,4',4"-triphenylmethane diisocyanate, polymethylene polyphenylisocyanates, hydrogenated polymethylene polyphenylisocyanates, toluene-2,4,6-triisocyanate, and 4,4'-dimethyldiphenylmethane-2,2',5,5'-tetraisocyanate. Preferred polyisocyanates include TDI, MDI and the so-called polymeric MDI products, which are a mixture of polymethylene polyphenylene isocyanates in monomeric MDI. Especially suitable polymeric MDI products have a free MDI content of from about 5 to about 40% by weight, more preferably about 10 to about 25% by weight, and have an average functionality (number of isocyanate groups per molecule) of about 2.7 to 4.0, more preferably about 2.8 to about 3.4. Such polymeric MDI products are available from The Dow Chemical Company under the trade name PAPI®.

Hydroxy-functional acrylates and methacrylates contain an acrylate ($CH_2$=CH—C(O)—) or methacrylate ($CH_2$=C($CH_3$)—C(O)—) group and an isocyanate-reactive hydroxyl group. Suitable hydroxy-functional acrylates and methacrylates include 2-hydroxyethyl acrylate, 2-hydroxyethyl methacrylate (HEMA), 2-hydroxylpropyl acrylate, 2-hydroxypropyl methacrylate, 4-hydroxy-n-butyl acrylate, 2-hydroxy-n-butyl acrylate, 2-hydroxy-n-butyl methacrylate, 4-hydroxy-n-butyl methacrylate, poly(oxyethylene)- and/or poly(oxypropylene)- esters of acrylic or methacrylic acid, wherein the number of oxyethylene and/or oxypropylene groups is preferably from about 2 to about 10, and the like. Of the foregoing, the methacrylates are preferred, especially when the polyol component contains primary amine compounds. HEMA is especially preferred.

The polyol(s) used in making the isocyanate-terminated prepolymer has an average at least about 2, advantageously about 2 to about 6, especially about 2 to about 3 and even more especially about 2 to about 2.5 hydroxyl groups per molecule (functionality). The equivalent weight per hydroxyl group can vary widely, so long as the prepolymer has the desired equivalent weight. The equivalent weight of each polyol may range from about 31 to 1500 or more, but is preferably below about 500, more preferably below about 300 and even more preferably about 200 or below.

Suitable polyols for use in making the isocyanate-terminated prepolymer include compounds such as alkylene glycols (e.g., ethylene glycol, propylene glycol, 1,4-butane diol, 1,6-hexanediol and the like), glycol ethers (such as diethylene glycol, triethylene glycol, dipropylene glycol, tripropylene glycol and the like), glycerine, trimethylolpropane, tertiary amine-containing polyols such as triethanolamine, triisopropanolamine, and ethylene oxide and/or propylene oxide adducts of ethylene diamine, toluene diamine and the like, polyether polyols, polyester polyols, and the like. Among the suitable polyether polyols are polymers of alkylene oxides such as ethylene oxide, propylene oxide and 1,2-butylene oxide or mixtures of such alkylene oxides. Preferred polyethers are polypropylene oxides or polymers of a mixture of propylene oxide and a small amount (up to about 12 weight percent) ethylene oxide. These preferred polyethers can be capped with up to about 30% by weight ethylene oxide.

Polyester polyols are also suitable in making the prepolymer. These polyester polyols include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of about 150 or less and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. Polycaprolactone polyols such as those sold by The Dow Chemical Company under the trade name "Tone" are also useful.

Preferred polyols for making the prepolymer are alkylene glycols, glycol ethers of up to about 75 equivalent weight, glycerine, trimethylolpropane, triethanolamine, triisopropanolamine, and poly(propylene oxide) polyols of up to about 200 equivalent weight.

The prepolymer is conveniently prepared by mixing the organic polyisocyanate, hydroxy-functional acrylate or methacrylate and polyol and subjecting the mixture to conditions such that the isocyanate and hydroxyl groups react to form the prepolymer. Generally, the reaction time is at least about 10 minutes to at most about 48 hours. The temperature of the mixing and reaction step may vary over a large range, but generally is limited so that reactants do not decompose, the acrylate or methacrylate groups do not polymerize to any significant extent and the reaction proceeds at a practicable rate. A preferred temperature is from about 20–75° C. The reactants are generally contacted under a dry atmosphere and preferably under nitrogen or other inert atmosphere. It is preferred to prepare the prepolymer in the absence of materials and conditions such as free radical initiators that promote the polymerization of the acrylate and/or methacrylate groups.

A catalyst may be and preferably is used in making the prepolymer. Suitable catalysts include those described by U.S. Pat. No. 4,390,645, incorporated herein by reference. Representative catalysts include:

(a) tertiary amines, such as trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl)ether, morpholine,4,4'-(oxydi-2,1-ethanediyl)bis and triethylenediamine;

(b) tertiary phosphines, such as trialkylphosphines and dialkylbenzylphosphines;

(c) chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni;

(d) acidic metal salts of strong acids, such as ferric chloride, stannic chloride, stannous chloride, antimony trichloride, bismuth nitrate and bismuth chloride;

(e) strong bases, such as alkali and alkaline earth metal hydroxides, alkoxides and phenoxides;

(f) alcoholates and phenolates of various metals, such as $Ti(OR)_4$, $Sn(OR)_4$ and $Al(OR)_3$, wherein R is alkyl or aryl, and the reaction products of the alcoholates with carboxylic acids, beta-diketones and 2-(N,N-dialkylamino)alcohols;

(g) salts of organic acids with a variety of metals, such as alkali metals, alkaline earth metals, Al, Sn, Pb, Mn, Co, Ni and Cu including, for example, sodium acetate, stannous octoate, stannous oleate, lead octoate, metallic driers, such as manganese and cobalt naphthenate; and (h) organometallic derivatives of tetravalent tin, trivalent and pentavalent As, Sb and Bi and metal carbonyls of iron and cobalt.

Catalysts are typically used in small amounts. For example, the total amount of catalyst used in making the prepolymer composition may be about 0.0015 to about 5, preferably from about 0.01 to about 1 percent by weight.

The isocyanate component may contain a plasticizer. The plasticizer may also be added after the prepolymer is made, or may be present during its formation. A plasticizer may perform several functions, such as reducing the prepolymer viscosity so it is easier to process and handle, modifying the rate of the foaming reaction, or softening or otherwise modifying the physical properties of the resulting polyurethane foam. The plasticizer is generally devoid of groups that react with the organic polyisocyanate, hydroxy-functional acrylate or methacrylate and polyol. Examples of plasticizers include phthalates (e.g., dioctyl phthalate, diisooctyl phthalate, dimethyl phthalate, dibutyl phthalate and mixtures of phthalates, such as those sold by BASF Corporation, Mt Olive, N.J., under the trade name PLATINOL™ (such as Platinol™ 79P)), phosphates (e.g., tributyl phosphate, triphenyl phosphate and cresyl diphenyl phosphate), chlorinated biphenyls, and aromatic oils such as VYCULT™ U-V (sold by Crowley Chemicals) and Jayflex™ L9P (sold by Exxon Chemicals). The amount of plasticizer, when employed, may range over a wide range depending on the foam properties desired. Generally, the plasticizer, when present, ranges from about 1 percent to at most about 50, preferably from about 15 to about 45 percent by weight of the polyisocyanate composition.

The prepolymer composition may also be made in the presence of a surfactant, such as those described by U.S. Pat. No. 4,390,645 incorporated by reference. The surfactant is typically used if desired to help compatibilize the other components used in making the prepolymer. In addition, the surfactant may be one that plays a beneficial role in forming a foam from the prepolymer. Examples of surfactants include nonionic surfactants and wetting agents, such as those prepared by the sequential addition of propylene oxide and then ethylene oxide to propylene glycol, solid or liquid organosilicones, polyethylene glycol ethers of long chain alcohols, tertiary amine or alkylolamine salts of long chain alkyl acid sulfate esters, alkyl sulfonic esters and alkyl arylsulfonic acids. The surfactants prepared by the sequential addition of propylene oxide and then ethylene oxide to propylene glycol are preferred, as are the solid or liquid organosilicones. Non-hydrolyzable liquid organosilicones are more preferred. When a surfactant is used, it is typically present in an amount of about 0.0015 to about 1 percent by weight of the prepolymer component.

The fully formulated isocyanate component advantageously has an isocyanate equivalent weight of from about 150, preferably from about 175, to about 750, preferably to about 500, more preferably to about 400. The isocyanate functionality (exclusive of non-reactive materials such as plasticizers, surfactants and the like) is advantageously at least about 2.0, preferably at least 2.5, to about 4.0, preferably to about 3.5, more preferably to about 3.2 isocyanate groups/molecule on average.

The isocyanate component also preferably contains less than 25%, more preferably less than about 12%, especially 10% by weight or less of monomeric diisocyanates. By "monomeric diiisocyanates", it is meant isocyanate compounds that do not contain urethane, urea, biuret or carbodiimide linkages, that have a molecular weight of 300 or less or which are otherwise formed in the reaction of two or more isocyanate-containing compounds. Having such a low monomeric diisocyanate content substantially reduces the risks of polyisocyanate inhalation exposure, so costly engineering controls such as downdraft ventilation can be substantially reduced or potentially eliminated.

The polyol component includes (i) a polyol or mixture of polyols and (ii) an effective amount of a blowing agent. The polyol component will most typically include a blend of two or more different polyols. The functionality (average number of isocyanate-reactive groups/molecule) of the polyol component (including polyols and amine-functional compounds as described below, but exclusive of non-isocyanate reactive materials, reactive catalysts as described below and water, if present) is at least about 2.3.

Suitable polyols are compounds having at least two isocyanate-reactive hydroxyl groups per molecule, provided that the polyol component has an average functionality of at least about 2.3, preferably at least about 2.5, to about 6.0, preferably to about 4.0. The functionality of the individual polyols preferably ranges from about 2 to about 12, more preferably from about 2 to about 8. As is discussed more fully below, mixtures of two or more polyols together with other isocyanate-reactive compounds are preferred. The hydroxyl equivalent weight of the individual polyols may range from about 31 to about 2000 or more. However, the equivalent weight of the polyol component as a whole is selected such that when the ratio of isocyanate groups in the polyisocyanate component to the number of isocyanate-reactive groups in the polyol component is from about 0.8:1 to about 1.5:1, the volume ratio of polyisocyanate to polyol component is no greater than 10:1. Preferably, the hydroxyl equivalent weight of the individual polyols is from about 31 to about 500, more preferably from about 31 to about 250, even more preferably from about 31 to about 200.

Among the suitable polyols are those described above with respect to the isocyanate-terminated prepolymer.

It is preferred that the polyol component includes at least a small amount of a tertiary amine-containing polyol and/or an amine-functional compound. The presence of these materials tends to increase the reactivity of the polyol component during the early stages of its reaction with the polyisocyanate component. This in turn helps the reaction mixture to build viscosity more quickly when first mixed and applied without unduly decreasing cream time, and thus reduces run-off or leakage.

Such tertiary amine-containing polyols include, for example, triisopropanol amine, triethanolamine and ethylene and/or propylene oxide adducts of ethylene diamine, toluene diamine or aminoethylpiperazine having a molecular weight of up to about 800, preferably up to about 400. When present, tertiary amine-containing polyols may constitute a minor or a major component of the polyol component. (In this invention, a "major" or "main" amount or a "major" or "main" component is one constituting at least 50 weight percent of the polyol component as a whole.) For example, the tertiary amine-containing polyol may constitute from about 1 to about 80% by weight of the polyol component.

The amine-functional compound is a compound having at least two isocyanate-reactive groups, of which at least one is a primary or secondary amine group. Among these are monoethanolamine, diethanolamine, monoisopropanol amine, diisopropanol amine and the like, and aliphatic polyamines such as aminoethylpiperazine. Also included among these compounds are the so-called aminated polyethers in which all or a portion of the hydroxyl groups of a polyether polyol are converted to primary or secondary amine groups. Suitable such aminated polyethers are sold by Huntsman Chemicals under the trade name JEFFAMINE®. Typical conversions of hydroxyl to amine groups for these commercial materials range from about 70–95%, and thus these commercial products contain some residual hydroxyl groups in addition to the amine groups. Preferred among the aminated polyethers are those having a weight per isocyanate-reactive group of about 100–1700 daltons, especially about 100–250 daltons, and having 2–4 isocyanate-reactive groups per molecule.

These amine-functional compounds advantageously constitute no greater than about 10 weight percent, preferably from about 0.25 to about 7.5 weight percent of the total weight of the polyol component.

In order to impart toughness to the foam, a minor amount of a high (i.e. 800 or higher, preferably about 1500–3000) equivalent weight polyol may be added to the polyol component, as well. This high equivalent weight polyol is preferably a polyether polyol having two to three hydroxyl groups per molecule. It more preferably is a polypropylene oxide) that may be end-capped with up to 30% (by weight of the polyol) of poly(ethylene oxide). The high equivalent weight polyol may contain dispersed polymer particles. These materials are commercially known and are commonly referred to as "polymer polyols" (or, sometimes "copolymer polyols"). The dispersed polymer particles may be, for example, polymers of a vinyl monomer (such as styrene, acrylonitrile or styrene-acrylonitrile particles), polyurea particles or polyurethane particles. Polymer or copolymer polyols containing from about 2 to about 50% or more by weight dispersed polymer particles are suitable. When used, this polymer or copolymer polyol may constitute up to about 45%, preferably from about 5 to about 40%, of the weight of all isocyanate-reactive materials in the polyol component.

The polyol component also contains a blowing agent. Although physical blowing agents such as fluorocarbons, hydrofluorocarbons, chlorocarbons, chlorofluorocarbons and hydrochlorofluorocarbons can be used, the preferred blowing agents are chemical blowing agents that produce carbon dioxide during the foaming reaction. Among these chemical blowing agents are materials such as formate-blocked amines and water. The formate-blocked amines decompose under the foaming conditions to produce carbon dioxide. Water reacts with the polyisocyanate to form carbon dioxide gas that causes the reaction mixture to expand. The blowing agent is used in an amount sufficient to provide the foam with the aforementioned densities. When water is used as the blowing agent, about 0.5 to about 10, preferably from about 3 to about 8 parts by weight are used per 100 parts of polyol component.

Some preferred polyol mixtures for use in the polyol component include:

A. A mixture of a 2–3 functional non-amine-initiated polyether polyol of equivalent weight 200–500 as a main component, a 4–8 functional non-amine-initiated polyether polyol of equivalent weight of 250 or below, and an amine-initiated polyether polyol of equivalent weight of 200 or below. This may optionally contain up to about 10 weight percent (based on the total weight of the polyol component) of an amine-functional compound. The amine-functional compound is preferably an amine-terminated polyether.

B. A mixture of an amine-initiated polyether polyol of equivalent weight of 200 or below as a main component, up to about 10 weight percent (based on the total weight of the polyol component) of an amine-functional compound, and at least one 2–3 functional non-amine-initiated polyether polyol of equivalent weight 75–500. The amine-functional compound is preferably an amine-terminated polyether.

C. A 4–8 functional non-amine-initiated polyether polyol of equivalent weight of 250 or below as a main component, and an amine-functional compound of equivalent weight of 200 or below. The amine-functional compound is preferably an amine-terminated polyether. This formulation may also contain minor quantities (up to about 40% by weight of the polyol component) of least one 2–3 functional non-amine-initiated polyether polyol of equivalent weight 75–500.

All of these preferred polyol mixtures are preferably formulated into a polyol component that includes water and/or $CO_2$-producing chemical blowing agent and a reactive amine catalyst. Note that certain blocked amines, such as formic-acid blocked amine will perform the function of catalyzing the reaction as well as acting as a blowing agent through the generation of $CO_2$.

To form a foam, the polyol component is mixed with the isocyanate component in the presence of a catalyst for the reaction of the polyol or water with an isocyanate. Most typically, this catalyst will be incorporated into the polyol component. Suitable catalysts are described above with respect to the making of the prepolymer. However, tertiary amine catalysts are preferred, and especially preferred are the so-called "reactive" amine catalysts that contain a hydroxyl or primary or secondary amine group that can react with an isocyanate to become chemically bonded into the foam. Among these especially preferred catalysts are N,N, N-trimethyl-N-hydroxyethyl-bis (aminoethyl) ether (available from Huntsman Chemical under the trade name ZF-10) and dimethyl 1–2 (2-aminoethoxy) ethanol (available from Nitrol-Europe under the trade name NP-70), and those sold by Air Products under the trade names Dabco™ 8154 and Dabco™ T.

The amount of catalyst is selected to provide a desired reaction rate. The amount that is used will depend somewhat on the particular catalyst. Generally, the amounts described before with respect to the making of the prepolymer are suitable. However, when the preferred reactive amine catalysts are used, somewhat greater amounts can be used. For these reactive amine catalysts, the amount used preferably ranges from about 1 to about 15, more preferably from about 2 to about 13 percent of the total weight of the polyol component.

In addition, the polyol component and/or the prepolymer component can contain various auxiliary components as may be useful in making a rigid foam, such as surfactants, fillers, colorants, odor masks, flame retardants, biocides, antioxidants, UV stabilizers, antistatic agents, thixotropic agents and cell openers.

Suitable surfactants include commercially available polysiloxane/polyether copolymers such as Tegostab (trademark of Goldschmidt Chemical Corp.) B-8462 and B-8404, and DC-198 and DC-5043 surfactants, available from Dow Corning.

Examples of suitable flame retardants include phosphorous compounds, halogen-containing compounds and melamine.

Examples of fillers and pigments include calcium carbonate, titanium dioxide, iron oxide, chromium oxide, azo/diazo dyes, phthalocyanines, dioxazines and carbon black.

Examples of UV stabilizers include hydroxybenzotriazoles, zinc dibutyl thiocarbamate, 2,6-ditertiarybutyl catechol, hydroxybenzophenones, hindered amines and phosphites.

Examples of cell openers include silicon-based antifoamers, waxes, finely divided solids, liquid perfluorocarbons, paraffin oils and long chain fatty acids.

The foregoing additives are generally used in small amounts, such as from about 0.01 percent to about 1 percent by weight of the polyisocyanate component.

Foam according to the invention is prepared by mixing the polyol and polyisocyanate components and allowing the reactants to react and form a foam. Although this invention is not limited to any theory, it is believed that as the prepolymer reacts with the polyol component, the heat that is released causes the acrylate and/or methacrylate groups to polymerize, thus forming bridges between the prepolymer molecules and contributing to the overall network of the polymer in the cured foam. An advantage of this invention is that the reaction proceeds rapidly when the components are mixed at ambient to moderately elevated temperatures, such as from about 20 to about 70° C., preferably from about 35–65° C. This simplifies handling and applying the foam. Another advantage of the invention is that because of the low volume ratios of the polyol and isocyanate components, a variety of commonly available mixing and dispensing equipment can be used. In the applications of particular interest, the mixed isocyanate and polyol components are dispensed onto a part or assemblage where localized reinforcement, corrosion protection, sound insulation or vibration dampening is desired. The formulation then cures in place, generally without the further application of additional heat or energy for curing, although heating can be used if desired to speed the cure. Alternately, the foam can be formed separately and then glued or otherwise attached to the structural member. It is usually not necessary to apply heat to effect a full expansion and cure.

In making a foam, the ratios of the two components are advantageously selected so as to provide an isocyanate index (ratio of NCO to isocyanate-reactive groups) of about 0.8, preferably about 0.9, more preferably about 0.95, to about 1.5, preferably to about 1.25, more preferably to about 1.15. The polyol component and the isocyanate component are mixed in a volume ratio of less than 10:1, preferably from about 1:2 to 8:1, more preferably about 1:1.5 to 6:1, even more preferably from about 1:1 to 4:1. The density of the product foam is no greater than 45 pounds/cubic foot (720 kg/m³), and preferably is from about 1 (16), more preferably from about 2 (32), even more preferably from about 4 (64) pcf (kg/m³) to about 30 (480), more preferably to about 20 (320), even more preferably to about 15 (240) pcf (kg/m³).

The foam of the invention can be used in a variety of applications to structurally stiffen or reinforce areas to which it is applied. Load beams, pillars, rocker panels, roof rails and headers, cross members, and the like are examples of automotive body structural components that benefit from reinforcement from the foam of this invention. Many of these components are hollow or otherwise define a cavity. In some instances, the entire cavity will be filled by the foam. In other instances, the cavity may be only partially filled to provide increased stiffness or reinforcement in some localized area. In other instances, the foam of the invention may be applied to an area where two structural members meet, such as where vertical structural members meet horizontal structural members.

The following examples are provided to illustrate the invention, but are not intended to limit the scope thereof. All parts and percentages are by weight unless otherwise indicated.

EXAMPLES 1 AND 1A

A. Preparation of Prepolymer Component A

Prepolymer Component A is made by mixing the following components together under a nitrogen atmosphere and heating at 55° C. until a constant NCO content is obtained:

| Component | Parts by Weight | Equivalent Weight | Functionality |
|---|---|---|---|
| HEMA | 4.5 | 131 | 1 |
| 400 MW Poly(propylene oxide) | 5.5 | 200 | 2 |
| Polymeric MDI | 56.5 | 141 | 3.2 |
| Plasticizer (Jayflex ™ L9P) | 32.475 | — | 0 |
| Organosilicone Surfactant (SPI 202, from SPI Products) | 1.0 | — | Surfactant |
| Benzoyl Chloride | 0.025 | — | Stabilizer |

The resulting plasticized Prepolymer Component A has a % NCO of 14.24 weight percent, an equivalent weight of 295, a degree of polymerization of 1.55, a $M_n$ of 597 and an average functionality of 3.04 isocyanate groups/molecule.

B. Polyol Components A and A1

| Component | Parts by Weight | Equivalent Weight | Functionality |
|---|---|---|---|
| Sucrose-Initiated Poly (PO) polyol (Voranol 280, Dow Chemical) | 12.6 | 200.35 | 7 |
| Formic acid-blocked amine catalyst (DABCO 8154, from Air Products) | 10 | 112 | Catalyst and chemical blowing agent |
| Polyether polyol (PG 76-120, from Arch Chemicals) | 67.350 | 467.5 | 3 |
| Reactive amine catalyst (DABCO T, from Air Products) | 8.5 | 146 | — |
| Ethylene diamine-initiated poly (PO) polyol (Voranol 391, Dow Chemical) | 0.55 | 143.5 | 4 |
| Organosilicone Surfactant (Tegostab B-8404, Goldschmidt) | 1 | — | — |

Polyol Component A1 is made by mixing the following ingredients:

| Component | Parts by Weight | Equivalent Weight | Functionality |
|---|---|---|---|
| Amine-terminated polyether (Jeffamine T403, from Huntsman) | 13.4 | 156 | 3 |
| Amine-initiated polyether (Voranol 800 from Dow Chemical) | 43.1 | 70 | 4 |
| Ethylene diamine-initiated Polyether Poly (PO) polyol (Voranol 391, from Dow Chemical) | 40 | 143.5 | 4 |
| Reactive Amine Catalyst (DABCO T) | 5 | 146 | — |

-continued

| Component | Parts by Weight | Equivalent Weight | Functionality |
|---|---|---|---|
| Catalyst (SPI 847 from Specialty Products International) | 5 | — | — |
| Organosilicone Surfactant (Tegostab B-8404) | 2 | — | — |
| Water | 1.5 | — | — |

C. Preparation of Foam Example 1

Foam is prepared by dispensing Prepolymer Component A and Polyol Component A at a 4:1 volume ratio on a Gusmer foaming machine at a dispensing pressure of 450–700 psi (2760–4825 kPa), and allowing to cure at room temperature. Both components are preheated to 130–160° F. (54–71° C.) to reduce the viscosity and obtain better mixing. A foam having a density well below 45 pounds per cubic foot (720 kg/m$^3$) is obtained.

D. Preparation of Foam Example 1A

Foam Example 1A is made from Prepolymer Component A and Polyol Component 1A using the same general method as described in part C. Tack free time is around 10 seconds and density is 6.5 pounds/cubic foot (104 kg/m$^3$). The foam modulus (ASTM 1621D) is between 2000 and 3000 psi (13,800–20,700 kPa). Flow rate is about 60 g/s.

EXAMPLES 2 AND 2A

A. Preparation of Prepolymer Component B

Prepolymer Component B is made in the same general manner as Prepolymer Component A, using the following ingredients:

| Component | Parts by Weight | Equivalent Weight | Functionality |
|---|---|---|---|
| HEMA | 5.96 | 131 | 1 |
| 400 MW Poly(propylene oxide) | 5.416 | 200 | 2 |
| Polymeric MDI | 53.624 | 141 | 3.2 |
| Plasticizer (Platinol ™ 79P) | 35 | — | 0 |

The resulting plasticized Prepolymer Component B has a % NCO of 12.93 weight percent, an equivalent weight of 325, a degree of polymerization of 1.69, a Mn of 617 (exclusive of plasticizer) and an average functionality of 2.92 isocyanate groups/molecule (exclusive of plasticizer).

B. Polyol Components

Polyol Component B is made by mixing the following components:

| Component | Parts by Weight | Equivalent Weight | Functionality |
|---|---|---|---|
| Polyether Polyol (PG 76-120) | 18 | 467.5 | 3 |
| Primary Amine-Terminated Polyether (DA400, from Huntsman) | 5 | 200 | 2 |
| Reactive Amine Catalyst (DABCO T) | 12 | 146 | — |
| Ethylene diamine-initiated poly (PO) polyol (Voranol 391, from Dow Chemical) | 48 | 143.5 | 4 |

-continued

| Component | Parts by Weight | Equivalent Weight | Functionality |
|---|---|---|---|
| Formic acid-blocked reactive amine catalyst (DABCO 8154, Air Products) | 3.5 | 112 | — |
| Reactive Amine Catalyst (Polycat ™ 15) | 5 | 187 | — |
| Organosilicone Surfactant (Tegostab B-8404) | 2 | — | — |
| Water | 6.5 | 9 | — |

Polyol Component B1 is prepared by mixing the following components:

| Component | Parts by Weight | Equivalent Weight | Functionality |
|---|---|---|---|
| Polyether Polyol (PG 76-120) | 21 | 467.5 | 3 |
| Primary Amine-Terminated Polyether (DA400, from Huntsman) | 5 | 200 | 2 |
| Reactive Amine Catalyst (DABCO T) | 12 | 146 | — |
| Ethylene diamine-initiated poly (PO) polyol (Voranol 391, from Dow Chemical) | 48 | 143.5 | 4 |
| Reactive Amine Catalyst (Polycat ™ 15) | 5 | 187 | 1 |
| Organosilicone Surfactant (Tegostab B-8404) | 2 | — | — |
| Water | 7 | 9 | — |

C. Preparation of Foam Samples 2 and 2A

Foam Example 2 is prepared by mixing Prepolymer Component B and Polyol Component B in the general manner described in Example 1. Modulus and stress (ASTM D1621D) are 192 psi (1325 kPa) and 11 psi (76 kPa), respectively. Core density is 2.23 pounds/cubic foot (36.8 kg/m$^3$).

Foam Example 2A is prepared by mixing Prepolymer Component B and Polyol Component B1 in the general manner described in Example 1. The density of the foam is below 45 pounds per cubic foot (720 kg/m$^3$).

EXAMPLE 3

A. Preparation of Prepolymer Component C

Prepolymer Component C is made in the same general manner as Isocyanate-Terminated Prepolymer A, using the following ingredients:

| Component | Parts by Weight | Equivalent Weight | Functionality |
|---|---|---|---|
| HEMA | 6.855 | 131 | 1 |
| Propylene glycol | 1.097 | 38 | 2 |
| Polymeric MDI | 51.548 | 141 | 3.2 |
| Plasticizer (VYCOL UV) | 39.5 | — | 0 |
| Organosilicone Surfactant (SPI 202) | 1.0 | — | — |

The resulting plasticized Prepolymer Component C has a % NCO of 11.95 weight percent, an equivalent weight of 352, a degree of polymerization of 1.97 and an average functionality of 2.85 isocyanate groups/molecule.

B. Polyol Component C

Polyol Component C is made by mixing the following components:

| Component | Parts by Weight | Equivalent Weight | Functionality |
|---|---|---|---|
| Sucrose-Initiated Poly (PO) polyol (Voranol 280 from Dow Chemical) | 28.5 | 200.35 | 7 |
| Sucrose/Glycerine-Initiated Poly(PO) polyol (Voranol 240–360 from Dow Chemical) | 43.5 | 155.5 | 4.5 |
| Amine-terminated polyether (DA400 from Dow Chemical) | 5 | 200 | 2 |
| N,N,N'-trimethyl-N'-hydroxyethyl bis(aminoethyl) ether (ZF-10, from Huntsman) | 9.5 | 190 | — |
| Dimethyl-1,2-(2-aminoethyoxy)ethanol | 3 | 133 | — |
| Organosilicone Surfactant (Tegostab B-8404) | 3 | — | — |
| Water | 7.7 | 9 | — |

C. Foam Preparation

Foam Example 3 is prepared by mixing Prepolymer Component C and Polyol Component C in the general manner described in Example 1. The resulting foam has a density of below 45 pounds per cubic foot (720 kg/m$^3$).

What is claimed is:

1. A method of making a rigid polyurethane foam, comprising mixing a polyisocyanate component with a polyol component in the presence of at least one catalyst for the reaction of a polyol or water with a polyisocyanate and subjecting the mixture to conditions sufficient to cure to form a polyurethane foam having a bulk density of 45 pounds per cubic foot (720 kg/m$^3$) or less, wherein
   (a) the polyisocyanate component contains an isocyanate-terminated prepolymer made by reacting an excess of an organic polyisocyanate with (i) at least one polyol and (ii) at least one hydroxy-functional acrylate or methacrylate,
   (b) the polyol component contains an effective amount of a blowing agent and isocyanate-reactive materials have an average functionality of at least about 2.3 and include at least one polyol and,
   (c) the volume ratio of the polyisocyanate component to polyol component is no greater than 10:1, and
   (d) the ratio of isocyanate groups in the polyisocyanate component to the number of isocyanate-reactive groups in the polyol component is from about 0.8:1 to about 1.5:1.

2. The method of claim 1 wherein the volume ratio of polyisocyanate component to polyol component is 1:1.5 to 6:1.

3. The method of claim 1 wherein the polyol component and the prepolymer component are at a temperature of no greater than 70° C. when mixed.

4. The method of claim 1 wherein the hydroxy-functional acrylate or methacrylate is a methacrylate.

5. The method of claim 1 wherein at least one polyol in the polyol component contains a tertiary amine group.

6. The method of claim 1 wherein the catalyst includes a reactive amine catalyst.

7. The method of claim 1 wherein the blowing agent is water or a chemical blowing agent. that releases $CO_2$.

8. An isocyanate-terminated prepolymer which is the reaction product of an excess of an organic polyisocyanate with (i) at least one polyol and (ii) at least one hydroxy-functional acrylate or methacrylate.

9. The prepolymer of claim 8 which has an isocyanate-equivalent weight of 150 to 500.

10. The prepolymer of claim 8 wherein the organic polyisocyanate is MDI or a polymeric MDI.

11. The prepolymer of claim 10 wherein the hydroxy-functional acrylate or methacrylate is hydroxyethyl methacrylate.

12. A reactive system comprising
   (a) a polyisocyanate component that contains an isocyanate-terminated prepolymer made by reacting an excess of an organic polyisocyanate with (i) at least one polyol and (ii) at least one hydroxy-functional acrylate or methacrylate,
   (b) a polyol component containing an effective amount of a blowing agent and isocyanate-reactive materials that have an average functionality of at least about 2.3 and include at least one polyol and,
   wherein the system is further characterized by
   (i) a volume ratio of polyisocyanate component to polyol component of no greater than 10:1,
   (ii) a ratio of isocyanate groups in the polyisocyanate component to isocyanate-reactive groups in the polyol component from about 0.8:1 to about 1.5:1 and
   (iii) at least one of the polyisocyanate component or the polyol component containing a catalyst for the reaction of an isocyanate with a polyol or water.

13. The reactive system of claim 12 wherein the volume ratio of polyisocyanate component to polyol component is 1:1.5 to 6:1.

14. The reactive system of claim 13 wherein the hydroxy-functional acrylate or methacrylate is a methacrylate.

15. The reactive system of claim 14 wherein the hydroxy-functional acrylate or methacrylate is hydroxyethyl methacrylate.

16. The reactive system of claim 12 wherein at least one polyol in the polyol component contains a tertiary amine group.

17. The reactive system of claim 12 wherein the catalyst includes a reactive amine catalyst.

18. The reactive system of claim 12 wherein the blowing agent is water or a chemical blowing agent that releases $CO_2$.

19. The method of claim 1 wherein the hydroxy-functional acrylate or methacrylate is 2-hydroxyethyl methacrylate, 2-hydroxyethyl methacrylate, 2-hydroxypropyl acrylate, 2-hydroxypropyl methacrylate, 4-hydroxy-n-butyl acrylate, 4-hydroxy-n-butyl methacrylate, 2-hydroxy-n-butyl acrylate, 2-hydroxy-n-butyl methacrylate or a poly(oxyethylene)- and/or poly(oxypropylene) ester of acrylic or methacrylic acid wherein the number of oxyethylene and/or oxypropylene groups is preferably from about 2 to about 10.

20. The method of claim 19 wherein the mixed isocyanate and polyol components are dispensed onto a part or assemblage and cured in place to form localized reinforcement, corrosion protection, sound insulation or vibration dampening on the part or assemblage.

21. The prepolymer of claim 8 wherein the hydroxy-functional acrylate or methacrylate is 2-hydroxyethyl methacrylate 2-hydroxyethyl methacrylate, 2-hydroxypropyl acrylate, 2-hydroxypropyl methacrylate, 4-hydroxy-n-butyl acrylate, 4-hydroxy-n-butyl methacrylate, 2-hydroxy-n- butyl acrylate, 2-hydroxy-n-butyl methacrylate or a poly(oxyethylene)- and/or poly(oxypropylene) ester of acrylic or methacrylic acid wherein the number of oxyethylene and/or oxypropylene groups is preferably from about 2 to about 10.

22. The reactive system of claim 12 wherein the hydroxy-functional acrylate or methacrylate is 2-hydroxyethyl methacrylate, 2-hydroxyethyl methacrylate, 2-hydroxypropyl acrylate, 2-hydroxypropyl methacrylate, 4-hydroxy-n-butyl acrylate, 4-hydroxy-n-butyl methacrylate, 2-hydroxy-n-butyl acrylate, 2-hydroxy-n-butyl methacrylate or a poly(oxyethylene)- and/or poly(oxypropylene) ester of acrylic or methacrylic acid wherein the number of oxyethylene and/or oxypropylene groups is preferably from about 2 to about 10.

* * * * *